United States Patent
Chang

(10) Patent No.: US 9,337,575 B1
(45) Date of Patent: May 10, 2016

(54) ELECTRONIC DEVICE INCLUDING ELECTRONIC CARD CONNECTOR

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/688,632

(22) Filed: Apr. 16, 2015

(30) Foreign Application Priority Data

Nov. 26, 2014 (CN) .......................... 2014 1 0689515

(51) Int. Cl.
*H01R 13/60* (2006.01)
*H01R 13/629* (2006.01)

(52) U.S. Cl.
CPC .................................... *H01R 13/629* (2013.01)

(58) Field of Classification Search
CPC ........... H01R 13/6205; H01R 13/7037; H01R 13/2421; H01R 13/652; H01R 11/30
USPC ............................................... 439/38–40, 13
See application file for complete search history.

(56) References Cited

U.S. PATENT DOCUMENTS

| 4,449,775 | A | * | 5/1984 | de Pommery | G06K 7/0017 |
| | | | | | 235/441 |
| 5,025,919 | A | * | 6/1991 | Brinker | B42D 5/006 |
| | | | | | 206/214 |
| 7,988,454 | B1 | * | 8/2011 | Liu | G06K 13/08 |
| | | | | | 439/38 |

* cited by examiner

*Primary Examiner* — Hien Vu
(74) *Attorney, Agent, or Firm* — Novak Druce Connolly Bove + Quigg LLP

(57) ABSTRACT

An electronic device includes a housing and a connector mounted in the housing. An open portion is defined in the housing. The connector includes a mounting portion coupled to the housing, a rotating member rotatably mounted to the mounting portion and a tray mounted in the open portion. The rotating member includes a magnet arranged to one end of the rotating arm and a resisting portion extending from the other end of the rotating arm. The magnet is adjacent to an inside surface of the housing, and the resisting portion resists against the tray. The magnet rotates the rotating member to partly push the tray out from the open portion. The electronic device has a good sealing ability.

10 Claims, 5 Drawing Sheets

ELECTRONIC DEVICE INCLUDING ELECTRONIC CARD CONNECTOR

FIELD

The subject matter herein generally relates to electronic devices, especially to an electronic device which has an electronic card connector.

BACKGROUND

Electronic card connector, such as Subscriber Identity Model (SIM) card, Secure Digital Memory (SD) card, or the like can be inserted into an electronic device, so that the electronic device can communicate with other electronic devices or store information.

BRIEF DESCRIPTION OF THE DRAWINGS

Implementations of the present technology will now be described, by way of example only, with reference to the attached figures.

DETAILED DESCRIPTION

Figure 1:
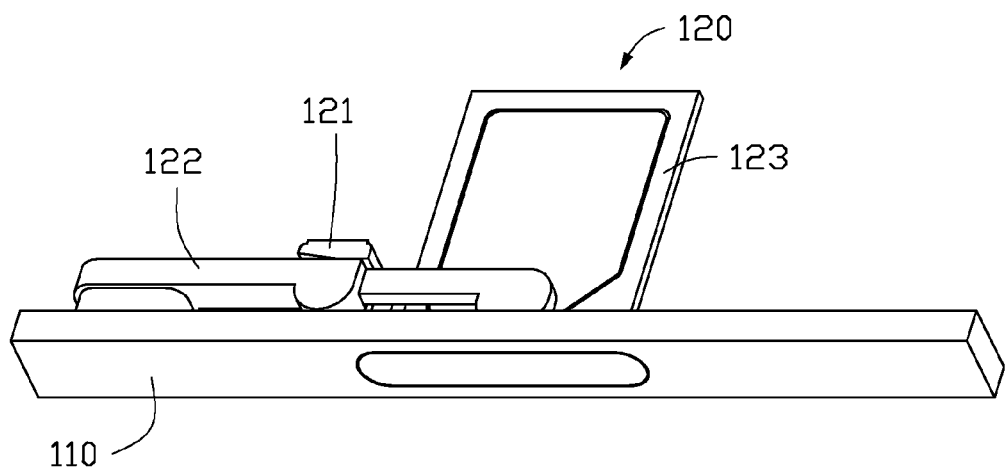
FIG. 1 is an isometric view of an embodiment of an electronic device including an electronic card connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of an electronic device 100. The electronic device 100 can include a housing 110 and a connector 120 mounted in the housing 110. The connector 120 can include a mounting portion 121 extending from the housing 110, a rotating member 122 coupled to the mounting portion 121, and a tray 123 resisted against the rotating member 122. The rotating member 122 can rotate around the mounting portion 121 and partly push the tray 123 out from the housing 110.

Figure 2:
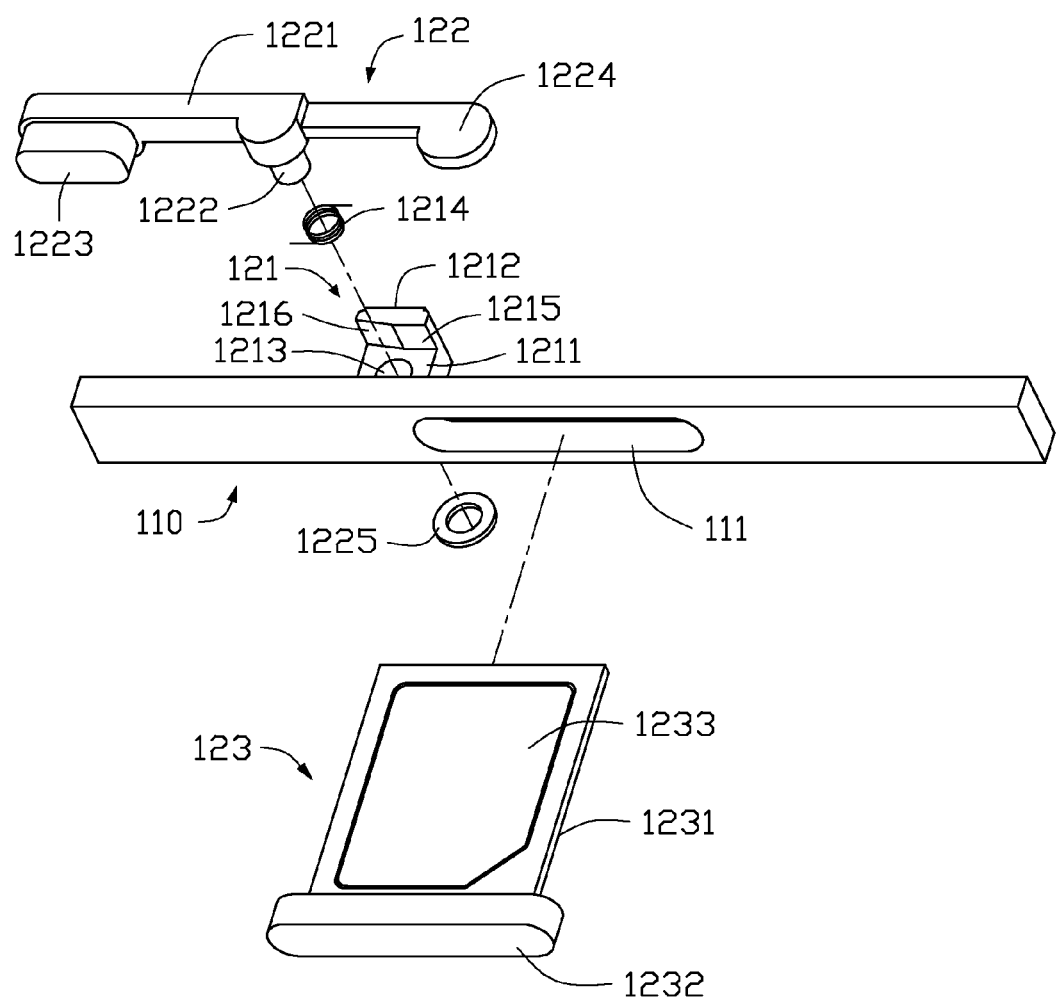
FIG. 2 is an exploded isometric view of the electronic device including the electronic card connector of FIG. 1.

FIG. 2 illustrates that an open portion 111 configured to mount the tray 123 can be defined in the housing 110. The housing 110 can be made of non-magnetic materials.

The mounting portion 121 can be arranged adjacent to the open portion 111. The mounting portion 121 can include a bottom board 1211 coupled to the housing 110 and a baffle 1212 vertically extending from the bottom board 1211. A mounting hole 1213 can be defined in the bottom board 1211 and can be configured to mount the rotating member 122. An elastic element 1214 can be arranged in the mounting hole 1213. The elastic element 1214 can supply proper torque for the rotating member 122 and one end of the rotating member 122 away from the open portion 111 can be attached to the housing 110. In this embodiment, the elastic element 1214 can be a torsion spring. The baffle 1212 can include a plane 1215 substantially parallel with the housing 110 and a bevel 1216 extending from the plane 1215 at a predetermined angle. The plane 1215 can limit an assembling location of the rotating member 122. The bevel 1216 can limit a rotating angle of the rotating member 122 and avoid the rotating member 122 pushing the tray 123 out from the open portion 111.

The rotating member 122 can be made of non-magnetic materials. The rotating member 122 can include a rotating arm 1221, a rotating rod 1222 formed in a substantially middle position of the rotating arm 1221, a magnet 1223 at one end of the rotating arm 1221 and a resisting portion 1224 extending on the other end, opposite the one end, of the rotating arm 1221. The rotating rod 1222 can be arranged in the mounting hole 1213 to rotate the rotating arm 1221. A fastening member 1225 can be mounted to a part of the rotating rod 1222 coming out from the mounting hole 1213. The magnet 1223 can be attached to an inside surface of the housing 110 and the resisting portion 1224 can be adjacent to the open portion 111 by the torque of the elastic element 1214.

The tray 123 can be made of non-magnetic materials. The tray 123 can include a tray body 1231 and a shoulder 1232 located on one end of the tray body 1231. A bearing chamber 1233 can be defined in the tray body 1231 and can be configured to mount a card (not shown). A shape of the shoulder 1232 can be same with that of the open portion 111. The shoulder 1232 can be closely matching the open portion 111 to enhance impermeability of the electronic device 100. The resisting portion 1224 can resist against the shoulder 1232 to partly push the tray 123 out from the open portion 111.

Figure 3:
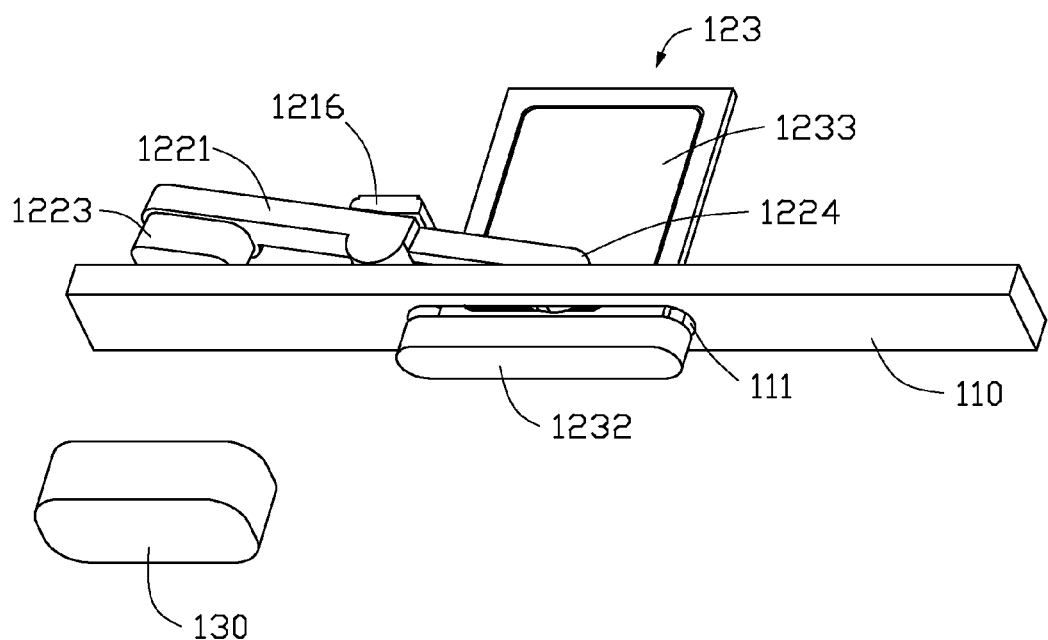
FIG. 3 is an isometric view of the electronic device including the electronic card connector of FIG. 1 in operation.

FIG. 3 illustrates operation principles of the electronic device 100. In the initial state, the tray 123 can be received in the open portion 111 and can be closely matching the open portion 111. The magnet 1223 can be attached to the inside surface of the housing 110 and the resisting portion 1224 can be adjacent to the open portion 111 by the torque of the elastic element 1214 (shown in FIG. 2).

A magnet 130 having a same magnetic characteristic with the magnet 1223 can be moved closely to the magnet 1223 outside the housing 110. The magnet 130 and the magnet 1223 can repel each other. The rotating arm 1221 can rotate to move the magnet 1223 away from the housing 110 and resist the resisting portion 1224 against the shoulder 1232. The shoulder 1232 can be pushed out from the open portion 111. Finally, the rotating arm 1221 can be resisted against the bevel 1216, the tray 123 can be partly pushed out from the open portion 111, and the card (not shown) can be conveniently taken out from the bearing chamber 1233.

The magnet 1223 can be returned to attach with the inside surface of the housing 110 by the torque of the elastic element 1214 when the magnet 130 is moved away.

In another embodiment, the elastic element 1214 can be omitted. The shoulder 1232 can resist against the resisting portion 1224 and return the rotating member 122 to the initial state.

Figure 4:
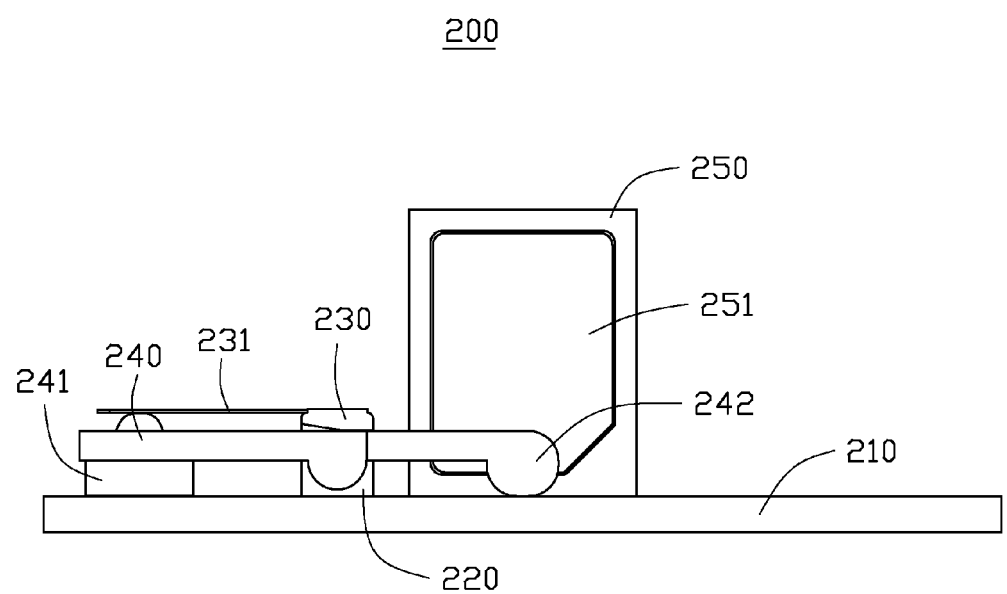
FIG. 4 is a diagrammatic view of another embodiment of an electronic device including an electronic card connector.

FIG. 4 illustrates another embodiment of an electronic device 200. The electronic device 200 can include a housing 210, a bottom board 220 extending from an inside surface of the housing 210, a baffle 230 vertically extending from the bottom board 220, a rotating member 240 rotatably mounted to the bottom board 220, and a connector 250 mounted to the housing 210.

An elastic element 231 can be mounted to the baffle 230. In this embodiment, the elastic element 231 can be a long spring plate. One end of the elastic element 231 can be coupled to the baffle 230, and the other end of the elastic element 231 can be resisted against a position of the rotating member 240 away from the connector 250.

The rotating member 240 can be made of non-magnetic materials. The rotating member 240 can include a magnet 241 arranged at one end of the rotating member 240 and a resisting portion 242 extending from the other end of the rotating member 240. The magnet 241 resisted by the elastic element 231 can be attached to the inside surface of the housing 210. The resisting portion 242 can be adjacently arranged with the connector 250 and can be configured to partly push the connector 250 out from the housing.

The connector 250 can be made of non-magnetic materials, and a bearing chamber 251 can be defined in the connector 250. The bearing chamber 251 can be configured to mount a card (not shown).

Figure 5:
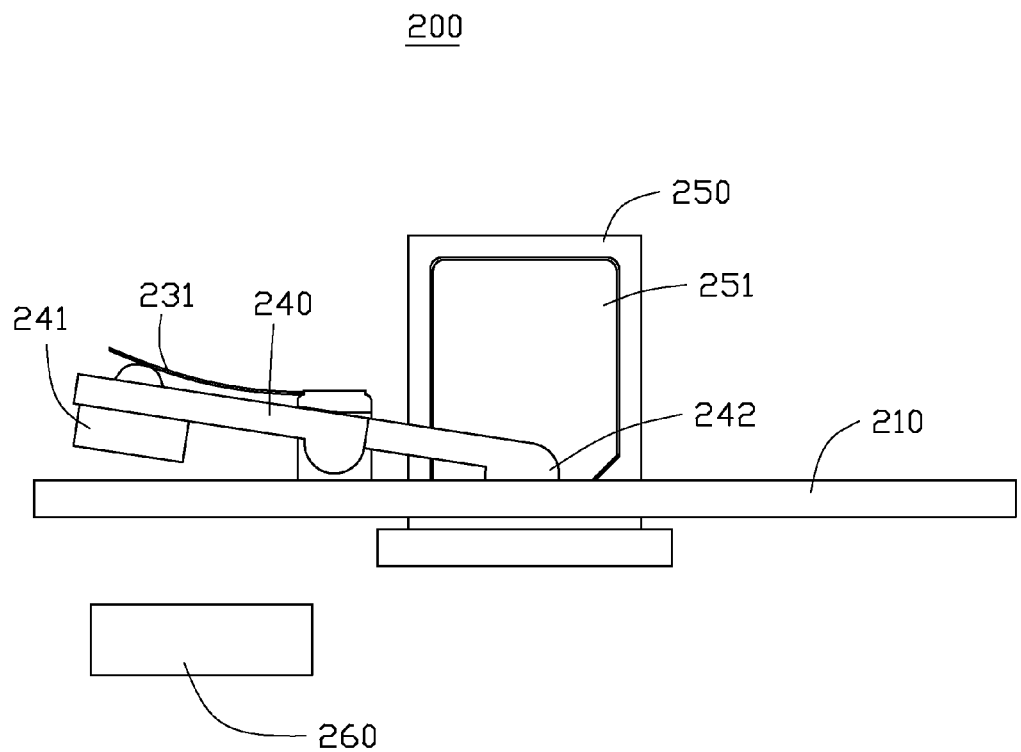
FIG. 5 is a diagrammatic view of the electronic device including the electronic card connector of FIG. 4 in operation.

FIG. 5 illustrates operation principles of the electronic device 200. In the initial state, the connector 250 can be received in the housing 210 and can be closely matching the housing 210. The magnet 241 can be attached to the inside surface of the housing 210 and the resisting portion 242 can be adjacent to the connector 250 by the torque of the elastic element 231.

A magnet 260 having a same magnetic characteristic with the magnet 241 can be adjacently moved to be close to the magnet 241 outside the housing 210. The magnet 260 and the magnet 241 can repel each other. The rotating member 240 can rotate to move the magnet 241 away from the housing 210 and resist the resisting portion 242 against the connector 250. The connector 250 can be partly pushed out from the housing 210, and the card (not shown) can be conveniently taken out from the bearing chamber 251.

The magnet 241 can be returned to attach with the inside surface of the housing 210 by the torque of the elastic element 231 when the magnet 260 is moved away.

In another embodiment, the elastic element 231 can be omitted. The connector 250 can resist against the resisting portion 242 and return the rotating member 240 to the initial state.

The embodiments shown and described above are only examples. Many details are often found in the art such as the other features of an electronic device including an electronic card connector. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising:
   a housing having an open portion;
   a connector mounted in the housing and comprising,
   a mounting portion extending from the housing;
   a rotating member rotatably mounted to the mounting portion, and having a first magnet at one end of the rotating member away from the open portion and a resisting portion extending on the other end, opposite the one end, of the rotating member adjacent to the open portion;
   a tray mounted in the open portion;
   wherein a second magnet is attached to an outside of the housing and the resisting portion is configured to resist insertion of the tray, and the second magnet repels the first magnet for rotating the rotating member to partly push the tray out from the open portion; and
   wherein the mounting portion comprises a bottom board and a baffle vertically extending from the bottom board; a mounting hole is defined in the bottom board; and the baffle is configured to limit a rotating angle of the rotating member.

2. The electronic device as claimed in claim 1, wherein a rotating rod is formed from the rotating arm, and the rotating rod is rotatably mounted in the mounting hole.

3. The electronic device as claimed in claim 1, wherein an elastic element is arranged in the mounting hole, and the elastic element supplies proper torque for the rotating member to attach one end of the rotating member away from the open portion with the housing.

4. The electronic device as claimed in claim 1, wherein a fastening member is mounted to a part of the rotating rod coming out from the mounting hole.

5. The electronic device as claimed in claim 1, wherein an elastic element is mounted to the baffle, and one end of the elastic element is coupled to the baffle, and the other end of the elastic element is resisted against a position of the rotating member away from the connector.

6. The electronic device as claimed in claim 1, wherein the baffle comprises a plane being parallel with the housing and a bevel extending from the plane at a predetermined angle.

7. The electronic device as claimed in claim 6, wherein the plane is configured to limit an assembling location of the rotating member and the bevel is configured to limit a rotating angle of the rotating member.

8. The electronic device as claimed in claim 1, wherein
   the tray comprises a tray body and a shoulder located on one end of the tray body;
   a bearing chamber configured to mounted a card is defined in the tray body.

9. The electronic device as claimed in claim 8, wherein a shape of the shoulder is same with that of the open portion, and the shoulder is closely matching the open portion.

10. The electronic device as claimed in claim 1, wherein the housing, the rotating member and the tray is made of non-magnetic materials.

\* \* \* \* \*